E. HOPKINSON.
PROCESS OF MANUFACTURING SHEET GLASS.
APPLICATION FILED MAY 18, 1914.
1,305,286.
Patented June 3, 1919.
3 SHEETS—SHEET 2.
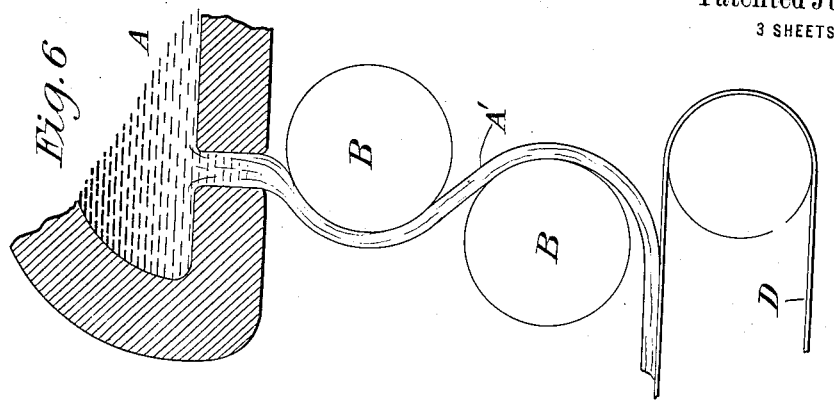
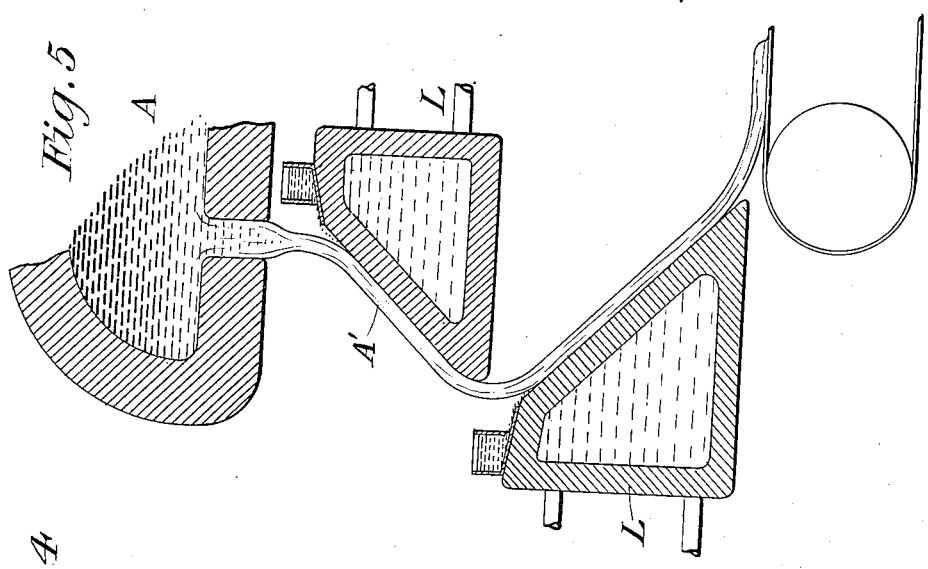
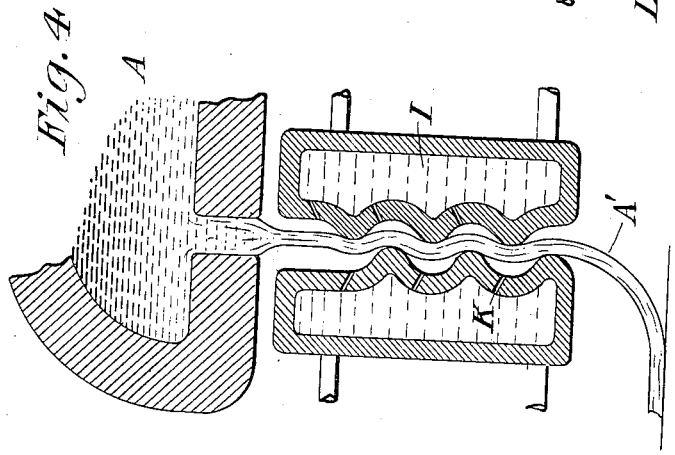
Witnesses:
Ernest Hopkinson
Inventor E. HOPKINSON.
PROCESS OF MANUFACTURING SHEET GLASS.
APPLICATION FILED MAY 18, 1914.
1,305,286.
Patented June 3, 1919.
3 SHEETS—SHEET 3.
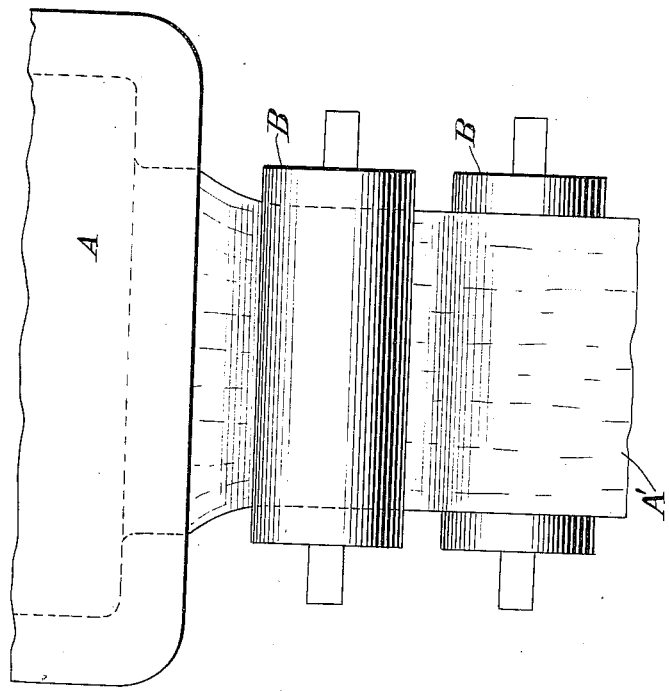
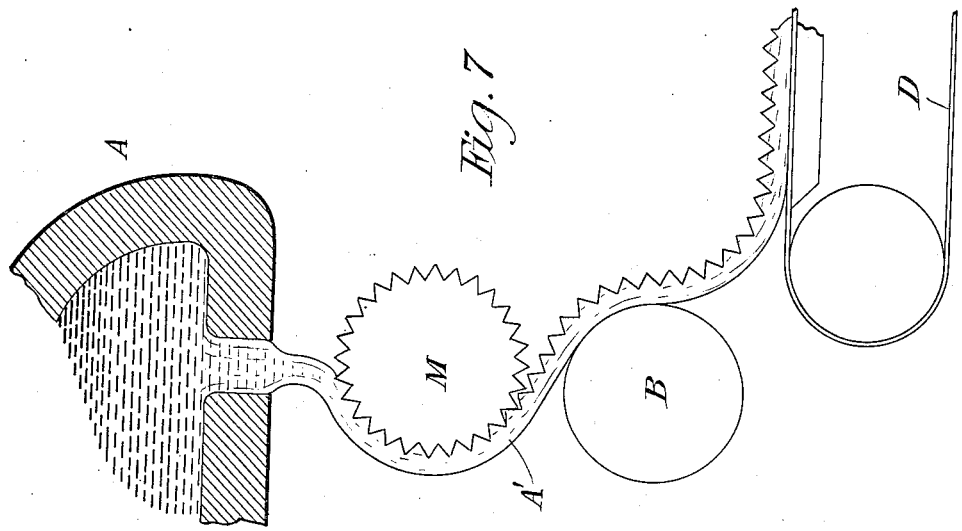
Witnesses:
Ernest Hopkinson
Inventor

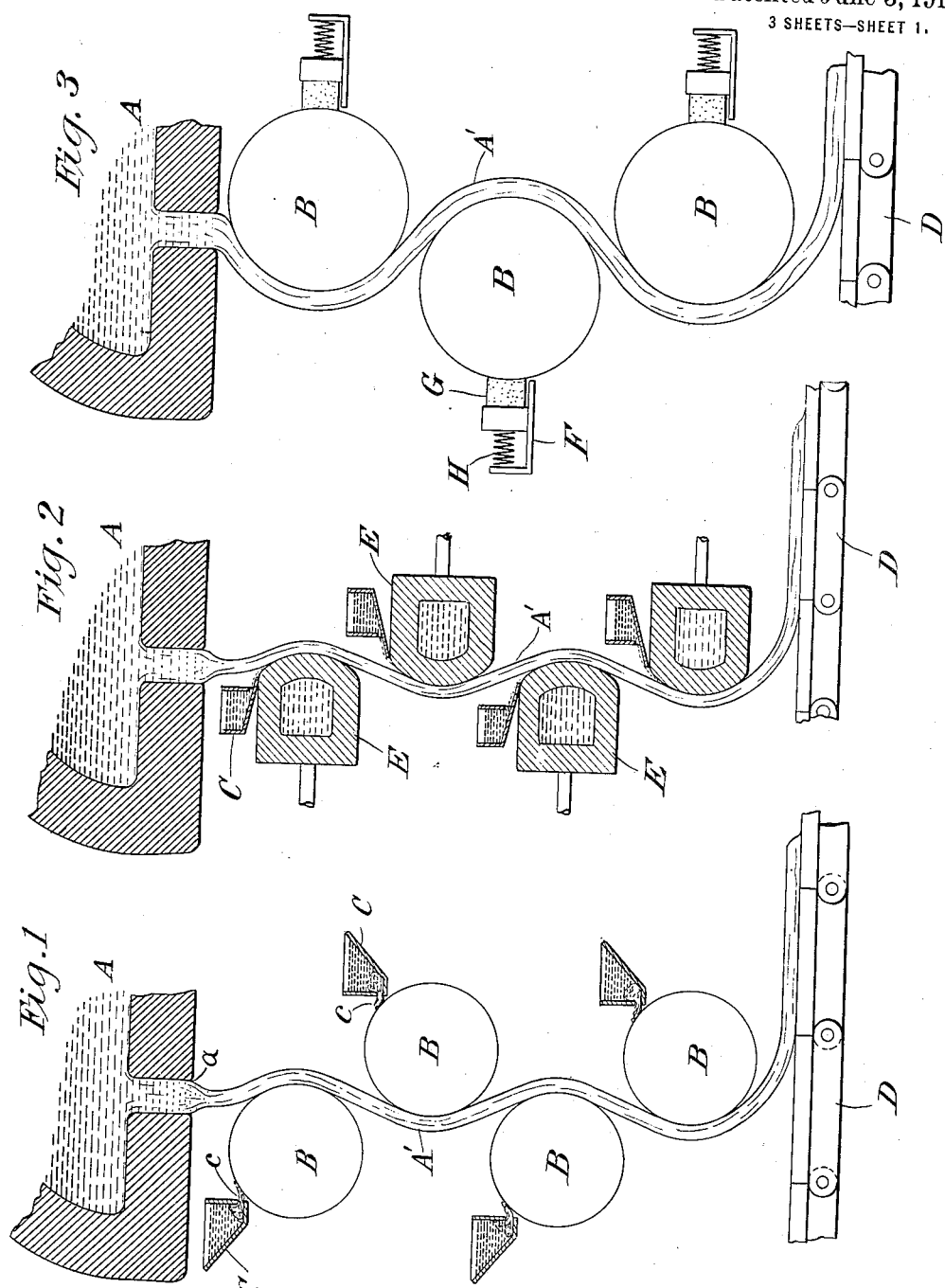

UNITED STATES PATENT OFFICE.

ERNEST HOPKINSON, OF EAST ORANGE, NEW JERSEY.

PROCESS OF MANUFACTURING SHEET-GLASS.

1,305,286.  Specification of Letters Patent.  Patented June 3, 1919.

Application filed May 18, 1914. Serial No. 839,235.

*To all whom it may concern:*

Be it known that I, ERNEST HOPKINSON, a citizen of the United States, and a resident of East Orange, county of Essex, and State of New Jersey, have invented certain new and useful Improvements in Processes of Manufacturing Sheet-Glass, of which the following is a full, clear, and exact disclosure.

The present invention relates to the manufacture of sheet glass, and so far as concerns this application is confined to the method or process of manufacture. Heretofore sheet glass has been formed in various ways. What is known as window glass has been and is now made by blowing a large cylinder of glass, cracking the cylinder along predetermined horizontal and vertical lines and then flattening out the longitudinally cracked cylindrical sections to produce sheets. This is a tedious and expensive operation and the product a very inferior article, full of waves and inequalities, giving a distorted appearance to everything seen therethrough. Again, the thickness and consequently the strength of window glass so made is limited by the exigencies of the process. Sheet glass of the best quality is known as plate glass. This is made by dumping the contents of one or more pots of molten glass on a heavy iron bed plate and then rolling the mass of molten glass into sheet form by passing a heavy metal roller over it, thus forming a sheet which must be of approximately twice the thickness of the sheet of plate glass made therefrom. The thick, rolled-out sheet of hot glass formed as just above described, is put into the leers and annealed. Upon coming out of the leers it is practically non-transparent as both sides are rough, full of crizzle marks and dull, all of which is caused by prolonged contact with the bed plate and the harsh treatment to which the molten mass has been subjected in being rolled out. To make this sheet transparent, both sides are ground and polished so that plate glass is expensive and difficult to make.

Various methods have been proposed in numerous patents for making sheet glass to be used in windows so as to obtain a product optically more perfect than plain window glass, and cheaper and easier of production than plate glass, but so far as my knowledge goes none of such processes has been practical and certainly none has any commercial use at the present time. In these efforts it has been proposed to pass molten glass through the bite of a pair of rolls mounted in various forms of mechanical organizations. Such efforts are futile for various reasons if it is desired to produce a transparent sheet of glass, smooth and lustrous on both sides and possible of use as window glass.

I have discovered, however, that transparent glass, far superior to ordinary window glass and in fact approaching plate glass to a marked degree in its optical quality, may be made by my method and apparatus. In the present application I confine myself to the method or process of manufacture which consists in flowing a stream of molten glass, preferably in sheet form and preferably from a source of original supply, such as an ordinary tank furnace, and passing or permitting the molten stream of glass to pass in contact with a suitable device having a curved or inclined surface which effects a deflection from the natural path of the stream in a vertical line, this deflection being unresisted by any mechanism contacting with the molten stream on the opposite surface thereof.

If a transparent optical glass of high quality is desired the flowing stream will be smoothed or polished and flattened on both sides by being deflected in opposite directions, but the invention may be measurably availed of by passing the molten stream over a deflecting device on one side only. This deflection of the molten stream of glass not only gives formation to the surface of the molten stream but partially supports it and this action assisted by the slight chilling action on the surface of the stream, sets it and acts to maintain substantially the wide sheet formation of the stream at its point of initial contact with the deflecting device or devices.

Further details of the invention will be given in connection with the description hereinafter given of the drawings, which constitute part of this specification, but which are intended to be merely diagrammatic illustrations indicating various forms of elements which may be utilized in carrying out the invention. No effort is made in the drawings to do more than this.

Figure 1 shows an apparatus diagrammatically for practising my invention in which the forming devices may be either stationary or revolved.

Fig. 2 shows the forming devices stationary and water cooled.

Fig. 3 shows forming devices similar to Fig. 1, the upper one being comparatively close to the outlet opening.

Fig. 4 shows the forming devices fixed and having undulating surfaces.

Fig. 5 shows the forming devices provided with inclined faces.

Fig. 6 shows two forming devices similar to Fig. 3.

Fig. 7 shows the first roll designed to give figured appearance to one side of the molten stream; and Fig. 8 illustrates the approximate relation of width of furnace projection, width of stream, and width of rolls.

Referring to the drawings in detail, Fig. 1 shows diagrammatically a portion of a furnace A projecting from any suitable glass melting tank. This projection is provided in its floor with an extended opening $a$ through which the molten glass flows to the surface-forming devices located below. I prefer that the opening shall be long and relatively narrow in order that the molten glass flowing therefrom shall be wide and relatively thin, or in other words in substantially sheet form. Of course it will be understood that if the finished sheet of glass is desired to be thick and narrow the opening may be substantially circular and of any desired practicable diameter. But the usual, natural and preferable form of the opening is such as to permit of the issuance of the molten stream in substantially sheet form, as illustrated and marked A'.

Of course in actual operation suitable devices will be provided for opening and closing the outlet through which the molten glass flows as also for regulating its size. And again, an entirely different form of furnace may be employed and different means for establishing the flow.

In this Fig. 1 the devices by which surface formation is given to the sheet of molten glass consist of a series of rolls staggered in a vertical line with relation to each other and successively projecting slightly across a vertical line from the discharge outlet of the furnace. These rolls I have designated by the letter B. They are stationary or revolved, as desired, at any desired rate of speed, either in unison or at varying rates of speed, and I have shown them as each provided with a lubricating device consisting of a hopper C filled with water or other suitable fluid, which is fed to the surface of the rolls by a wick $c$. This fluid acts as a lubricant between the surfaces of the rolls and the molten or semi-molten stream of glass with which they come in contact, and at the same time by its evaporation during contact with the molten glass, creates a film of gas which softens the contact between the rolls and the molten sheet and assists in the polishing and smoothing action. The rolls may be of any suitable material, polished metal or wood being preferred, or metal treated with some carbon preparation such as is used in what are called "paste molds."

It will be here noted that the stream of molten glass flowing from an outlet, such as the various illustrations of the drawings show, begins to lessen both in thickness and width immediately below the outlet, due to the action of gravity. In Figs. 1, 2, 4, 5, 7 and 8 I have illustrated the forming devices as located such a distance below the outlet that the action of gravity just referred to has begun to take place and an acceleration of flow has resulted. The instant the flowing stream touches the forming devices, however, the rate if acceleration is checked, the flowing stream partially supported and a smoothing and polishing action produced, and at the same time the surface of the flowing stream is slightly chilled and its tendency to change dimensions under the action of gravity is minimized. In Fig. 2 I have illustrated the forming devices as stationary, water-cooled, metal boxes E, having curved or rounded faces contacting with, deflecting and counteracting the action of gravity acceleration on the stream.

In Fig. 3 I have provided rolls similar to those illustrated in Fig. 1 but in this instance an additional principle of operation is involved by placing the first roll in such position adjacent the outlet from the furnace that the molten glass issuing therefrom has no opportunity to become accelerated under the action of gravity and there is practically no change in the dimensions of the stream. With such an arrangement of parts as is here illustrated, I do not purpose depending wholly on the action of gravity to determine the movement of the molten stream but depend partially upon the drawing action of the roll to feed the sheet of molten glass downward. In this way a thicker and more slowly moving stream is obtained. The rolls in this figure are also shown as lubricated by blocks of wax or similar material G, supported on brackets F and spring-pressed in contact with the face of the rolls by springs H.

In Fig. 4 I have shown the surface-forming devices as consisting of two water-cooled boxes I provided with undulating surfaces, apertures K being provided so that the water used to cool the boxes may be availed of to lubricate the portions of the undulating surfaces coming in contact with the molten stream.

In Fig. 5 I have illustrated two water-cooled boxes L each provided with inclined plane surfaces along which the molten stream passes and by which it is smoothed and polished. It will be understood that the two inclined planes illustrated are inclined in opposite directions.

In Fig. 6 I illustrate an arrangement similar to that illustrated in Fig. 3.

In Fig. 7 I have shown the first roll as designed to give a figured appearance to one side of the molten stream, and Fig. 8 is simply indicative of the approximate relation of width of furnace projection, width of stream and width of rolls.

In all the illustrations I have shown the formed sheet as carried by a conveyer device D at right angles to a vertical line from the furnace outlet. It will be understood, however, that I do not limit myself to this step in the process as I may either follow this procedure or cause the formed sheet to take a straight vertical path after being formed. The present invention is concerned only with the formation of a flowing stream into sheet form by effecting contact on one or both faces of the flowing stream, unresisted by contacting devices directly opposite, and subsequently maintaining the sheet thus formed in a flat condition.

Having thus described the form of my invention, what I claim and desire to protect by Letters Patent is:

1. The method of making sheet glass by causing a stream of molten glass to flow from a source of supply free from any contacting surface and then causing it to travel in a sinuous path and thereby effecting surface formation on both sides, the concave surfaces being in contact with forming devices and the convex surfaces being free during said travel.

2. The method of making sheet glass by causing a stream of molten glass to flow in a sinuous path and thereby effecting surface formation on both sides, the concave surfaces being in contact with the forming devices and the convex surfaces being free during said flow.

3. The method of making sheet glass by first causing a stream of molten glass to flow in a sinuous path and thereby effecting surface formation on both sides, the concave surfaces being in contact with forming devices and the convex surfaces being free during said flow and finally maintaining the sheet in a flat condition.

4. The method of making sheet glass by deflecting a flowing stream of molten glass in opposite directions and thereby giving formation to both surfaces, the deflecting devices contacting the one face of the sheet while the face directly opposite is maintained free.

5. The method of making sheet glass which consists in flowing a wide and relatively thin stream of molten glass and giving surface formation to one side thereof by effecting a smoothing action thereon by supporting said surface on an inclined support over which a thin sheet of water is permitted to flow, said side being unresisted from the opposite surface of the stream.

6. The method of making sheet glass which consists in flowing a wide and relatively thin stream of molten glass and giving surface formation thereto by successively effecting a smoothing action on each side of the stream unresisted from the opposite surface thereof.

Signed at New York, county of New York and State of New York this 16th day of May, 1914.

ERNEST HOPKINSON.

Witnesses:
HOMER BROOKE,
F. B. VANDERBILT.